Dec. 30, 1969  T. D. WOODWARD  3,486,406
SHEAR SUPPORT DEVICE
Filed March 29, 1968  3 Sheets-Sheet 1
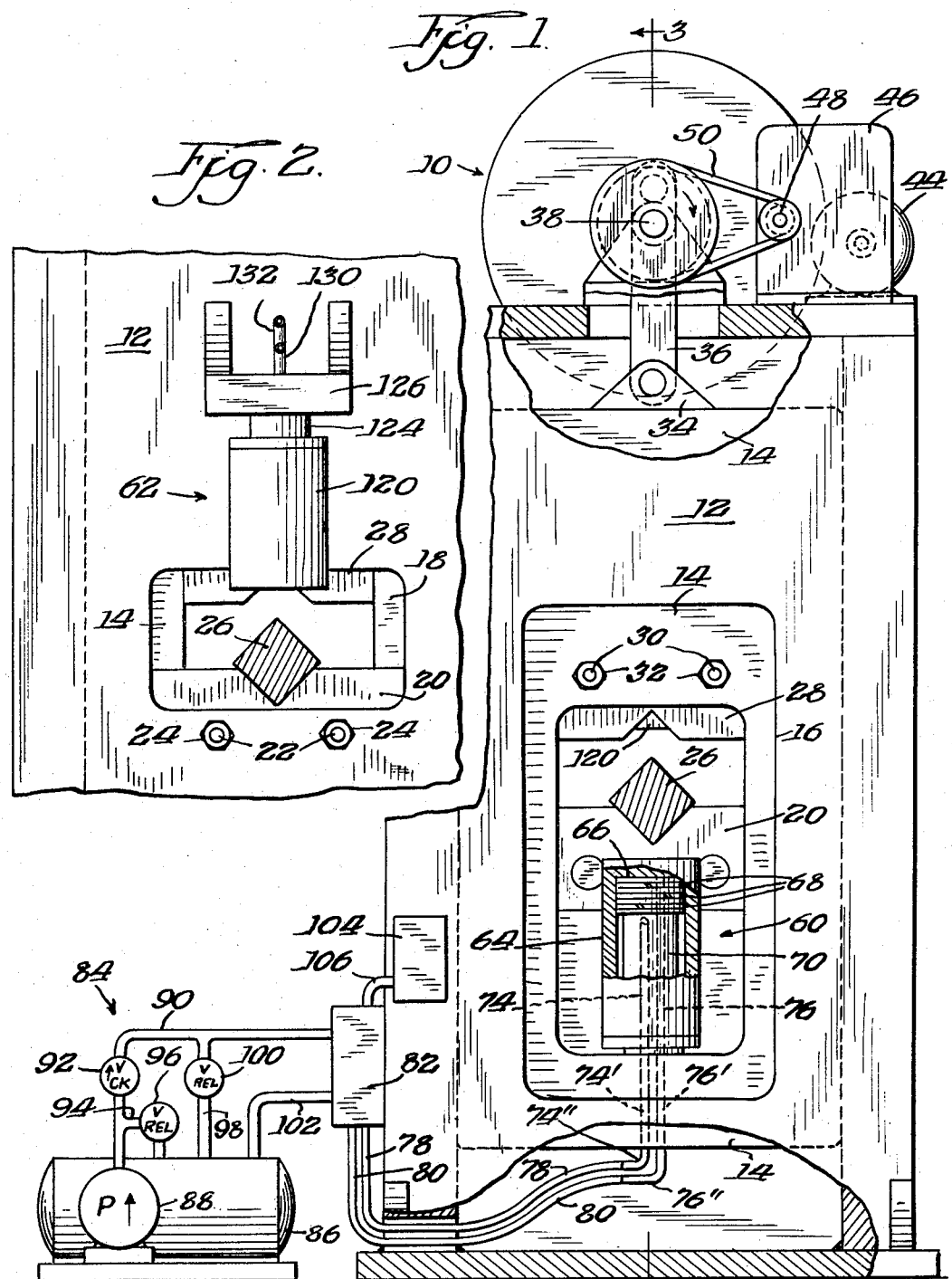
Inventor:
Thomas D. Woodward.
By Hume, Clement, Hume & Lee
Attys.

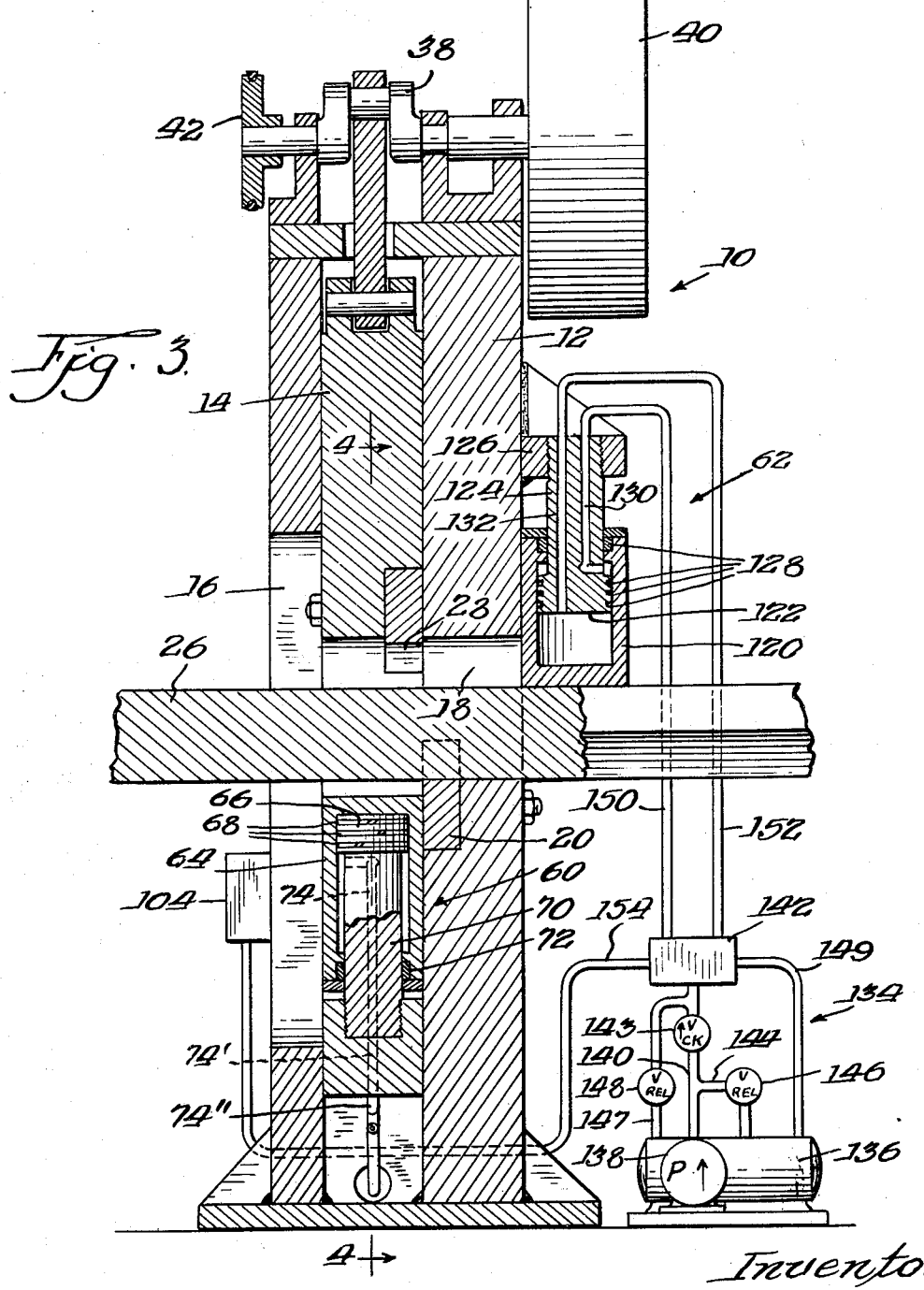

Dec. 30, 1969  T. D. WOODWARD  3,486,406
SHEAR SUPPORT DEVICE
Filed March 29, 1968  3 Sheets-Sheet 3
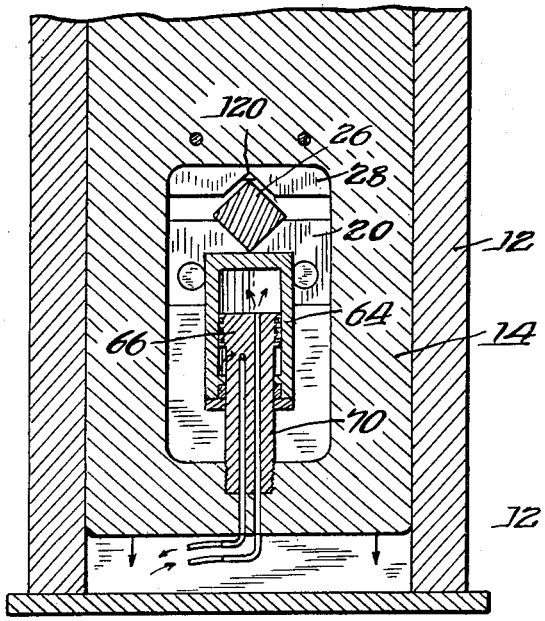
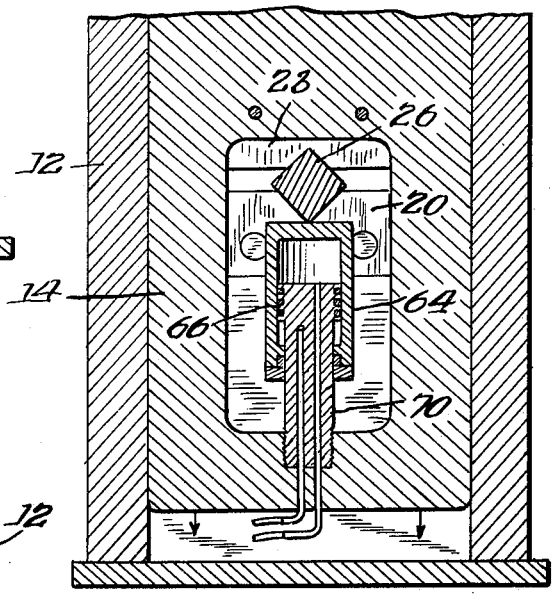
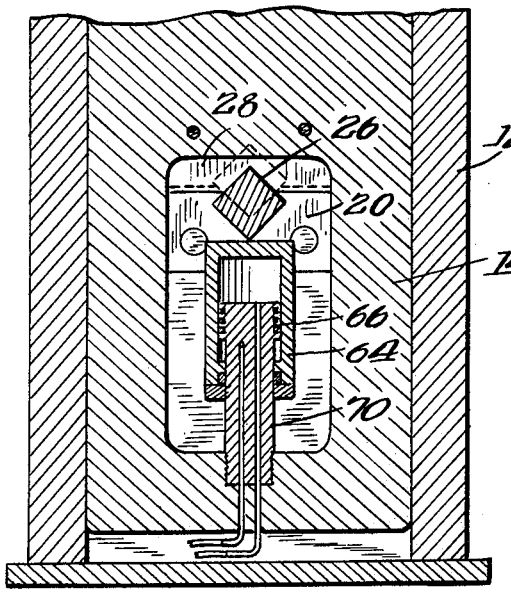
Inventor.
Thomas D. Woodward.
By Hume, Clement, Hume & Lee
Attys.

United States Patent Office 3,486,406
Patented Dec. 30, 1969

3,486,406
SHEAR SUPPORT DEVICE
Thomas D. Woodward, 7941 Monroe,
Munster, Ind. 46321
Filed Mar. 29, 1968, Ser. No. 717,142
Int. Cl. B26d 5/42
U.S. Cl. 83—378                               9 Claims

ABSTRACT OF THE DISCLOSURE

Support apparatus is provided for a conventional shearing machine to prevent plastic deformation of the material being sheared. The support apparatus is incorporated into a shear of the type having a ram carrying a moving knife which moves past a stationary knife. The support apparatus is carried by the ram, and includes a hydraulic cylinder mounted on a piston, the piston being fixedly mounted on the ram. The cylinder moves parallel to the ram, and contacts the underside of the material being sheared opposite the knife carried by the ram. The hydraulic cylinder has control means that move it into position below the material being sheared, and maintain it in rigid supporting contact therewith while the shear is made. Since the support device is carried by the ram, it moves downwardly along with the upper knife, in effect gripping the material being sheared between the support device and the upper knife. In the most preferred embodiment, the invention also includes hydraulic retaining or hold-down means comprising a similar hydraulic cylinder adapted to maintain the material being sheared in contact with the lower knife, and to prevent it from being tilted when the shear is made. The hydraulic system which controls the hold-down cylinder is basically identical to that which controls the support cylinder.

---

The present invention relates to an improved shearing appartus, and more specifically to an improved apparatus for shearing materials while providing support to prevent plastic deformation.

In the shearing of materials such as metal bar stock, plastic deformation of the metal has been a serious problem. While the shearing of relatively brittle metal presents no problem, when attempts are made to shear a metal having an elastic limit below its shear limit, the metal tends to deform. That is, when the moving knife of the shear contacts the metal, it exerts a force exceeding the elastic limit of the metal, bending it slightly before the shear limit is reached. This plastic deformation results in deformed, out-of-square ends on the sheared stock.

Many attempts have been made to solve the aforementioned problem. One solution is to employ a pair of shearing knives that closely fit the material being sheared on all sides. Thus, for example, a cylindrical bar of stock would be inserted through a pair of steel knives having aligned cylindrical apertures that just fit the stock. One of the knives would then be moved out of alignment with the other, shearing the stock. Since the stock is supported from all sides, there is no opportunity for plastic deformation. However, such an arrangement has the disadvantage that the apertures in the knives must exactly fit the stock being sheared, and it is therefore somewhat difficult to adapt this type of machine to varying sizes or shapes of stock. Another difficuilty is that any slight deformation in the stock will prevent it from easily penetrating the closely fitting, algined apertures.

Another suggested solution to the problem, which avoids some of the difficulties of the aligned apertures mentioned above, is the use of a hydraulic cylinder to provide support below the stock being sheared. The cylinder contacts the stock opposite the moving shearing knife, and the knife forces liquid out of the area between the piston and the top of the cylinder while the stock is being sheared. The liquid passes through a constriction of a size that ensures that the metal is supported with a force at least equal to the difference between the elastic limit of the stock and the required shearing force. While this type of device is more readily adapted to varying sizes and shapes of stock, considerable power and efficiency are lost since the shear must both force the liquid out of the cylinder and at the same time shear the stock. Although devices have been developed that overcome this problem of lost efficiency, most are quite complicated and expensive.

Generally, the present invention relates to support means for use in conjunction with a conventional shearing machine. The machine basically includes a frame, a stationary knife mounted on the frame and adapted to receive the material being sheared, a reciprocable ram, drive means for reciprocaing the ram and a movable knife fixedly mounted on the ram. The movable knife moves to a position adjacent to the stationary knife, at least partially passing it, in close spaced relationship. As the movable knife partially passes the stationary knife, the material is sheared. The improvement of the present invention comprises hydraulic support means carried by the ram, and positioned for movement parallel to the ram into contact with the material opposite the movable knife. The invention also includes suitable operating means for moving the support means into contact with the material and for maintaining it in rigid supporting contact with the metal when it is sheared by the knives. Since the support means in effect grip the metal between the movable knife and the support means themselves, deformation is prevented. It is, of course, essential that the support means support the material with a force at least equal to the difference between the elastic limit of the material and the force required to shear it.

The invention, both as to its organization and method of operation, together with the objects and advantages thereof, will be best appreciated by references to the following detailed description taken together with the drawings, in which:

FIGURE 1 is a partially fragmented front elevation of a shearing machine incorporating the preferred embodiment of the present invention, partially cut away to show some of the details;

FIGURE 2 is a fragmentary rear elevation of the apparatus of FIGURE 1;

FIGURE 3 is a cross-sectional view taken along lines 3—3 of FIGURE 1, but showing the hold-down cylinder in its lowered position;

FIGURE 4 is a fragmentary cross-sectional view taken along lines 4—4 of FIGURE 3, showing the ram as it begins its downward movement;

FIGURE 5 is a cross-sectional view similar to FIGURE 4, showing the shearing stroke as the ram just contacts the metal being sheared; and FIGURE 6 is a cross-sectional view similar to FIGURE 5, but showing the ram at the bottom of its stroke after the metal has been sheared.

Referring to the drawings, and more specifically to FIGURES 1 and 3, the apparatus of the present invention is shown in combination with a conventional shearing machine, generally indicated by reference numeral 10. While it will be appreciated that the apparatus of the present invention is not limited to use with a shearing machine of the design shown, the drawings illustrate, in somewhat simplified form, a typical machine.

Basically, the shearing machine 10 includes a box-shaped frame 12 having a wide central slot into which a ram 14 is inserted for vertical reciprocation. As shown in FIGURES 1 and 2, the frame has a relatively large, generally rectangular front aperture 16 and a smaller, generally rectangular rear aperture 18. A lower shearing knife 20 is fixedly mounted on the rear wall of the frame 12 and held in position by bolts 22 and nuts 24. Material to be cut, such as a metal billet 26 of generally square cross-section, is positioned on the lower knife 20. The lower knife 20 is shaped to fit the billet 26, and is easily interchangeable to fit billets of different shapes simply by removing the nuts 22 and bolts 24, as is well known in the art.

An upper shearing knife 28 is carried by the ram 14, and secured by bolts 30 and nuts 32. The upper knife 28 is also formed to fit the contours of the billet 26, and is easily interchangeable by removing the nuts 32 and bolts 30. As shown in FIGURE 3, the upper and lower shearing knives 28, 20, respectively, are mounted for movement to a position adjacent to one another and in close spaced relationship when the ram 14 moves in a downward direction.

At the top of the ram 14 is a bearing mount 34 to which the lower end of a connecting rod 36 is journalled. The opposite end of the connecting rod 36 is journalled to the offset portion of a crankshaft 38. The rear end of the crankshaft 38 carries a flywheel 40, while the front carries a pulley 42. Power for the crankshaft 38 is provided by an electric motor 44 connected to a reduction gear box 46. The reduction gear box 46 has a drive pulley 48 which is connected to the crankshaft pulley 42 by a power transmission belt 50.

The metal shearing machine described up to this point is generally conventional, and it will be understood that the invention is not limited to use with a shearing machine of this particular design. For example, the invention is equally adapted for use with an up-cut shear, that is, one with a knife which performs the cutting operation while moving in an upward direction. Similarly, the invention can be adapted for use with a shear where both knives are in motion during the shearing process.

Referring now to the improvement of the present invention, a preferred embodiment of which is shown in the drawings, the improvement generally comprises hydraulic support means carried by the ram 14, and generally indicated by reference numeral 60. As shown in FIGURES 1 and 3, the support means 60 are located below the billet 26 and opposite the upper shearing knife 28. The support means 60 provide support for the billet 26 opposite the upper shearing knife 28 during the shearing process.

As illustrated in FIGURE 2, in the most preferred embodiment, the present invention also includes hydraulic retaining means, generally indicated by reference numeral 62. The hydraulic retaining means 62 are located on the rear of the frame 12, above the billet and generally to the rear of both of the shearing knives 20, 28. The retaining means 62 generally insure that the billet 26 is firmly seated in the lower shearing knife 20 before the shearing step begins, as well as keeping the billet from "kicking up" as it is sheared.

Referring in more detail to the hydraulic support means 60, as shown in FIGURES 1 and 3 the support means 60 include a support cylinder 64 fitted over a piston 66. The piston 66 has rings 68 which form a sliding seal between the piston 66 and the interior of the cylinder 64. The piston is fixedly mounted on a rod 70, which in turn is fixedly mounted on the ram 14, and located to position the cylinder 64 below the billet 26 and the upper shearing knife 28. As shown in FIGURE 3, the cylinder 64 carries a sealing ring 72 to prevent the leakage of hydraulic fluid from the area below the piston 66.

As shown in FIGURE 1, in the preferred embodiment the piston rod 70 has a first internal fluid passage 74, communicating with the interior of the support cylinder 64 through the piston rod 70 just below the piston 66. A second internal fluid passage 76 communicates with the interior of the support cylinder 64 through the head of the piston 66. It will thus be seen that when hydraulic fluid is fed in through the second passage 76 and withdrawn through the first passage 74, the cylinder 64 will be caused to rise, while when this procedure is reversed, the cylinder 64 will move in a downward direction. It will be appreciated that other methods well known in the art may be used to provide a means for delivering hydraulic fluid to the interior of the cylinder 64 above and below the piston 66. For example, fluid passages could communicate with the interior of the cylinder 64 through the walls near the top and bottom thereof.

The internal fluid passages 74, 76 are aligned with corresponding passages 74′, 76′ in the interior of the ram 14, communicating with the passages 74, 76 at the base of the piston rod 70. A pair of L-shaped external pipes 74″, 76″ communicate with the first and second passages 74′, 76′, respectively, at the base of the ram 14. A first and a second flexible hose, 78, 80, respectively, provide communication between the L-shaped external pipes 74″, 76″, respectively, and a four-way solenoid valve 82.

The hydraulic operating means for the support means 60 are shown in FIGURE 1, generally indicated by reference numeral 84. Basically, the operating means 84 include a hydraulic fluid reservoir 86 communicating with a pump 88. A fluid delivery pipe 90 communicates between the pump 88 and the four-way solenoid valve 82. The fluid delivery pipe 90 has a check valve 92 which prevents flow toward the pump 88. A recirculation pipe 94 having a pressure release valve 96 provides communication between the fluid delivery pipe 90 and the reservoir 86. For reasons that will become apparent, it is essential that the recirculation pipe 94 communicates with the delivery pipe 90 at a point between the pump 88 and the check valve 92. In the most preferred embodiment, a pipe 98 having a safety release valve 100 provides communication between the fluid delivery pipe 90 and the reservoir 86. This pipe 98 communicates with the delivery pipe 90 between the check valve 92 and the solenoid valve 82. Finally, a hydraulic fluid return pipe 102 communicates between the reservoir 86 and the four-way solenoid valve 82. The solenoid valve 82 is controlled from a control box 104 through an electrical cable 106.

In operation, a piece of stock such as the billet 26 is inserted into the metal shearing machine 10 from the rear. The length of the section to be sheared is determined by the distance the billet 26 is inserted past the knives 20, 28 as is well known in the art. The billet 26 may be suitably moved by manual or automatic means (not shown). The electric motor 44 is then started, rotating the crankshaft 38, and the ram 14 begins its downward stroke. Simultaneously, responsive to a signal from the control box 104, the four-way solenoid valve 82 provides communication between the fluid delivery pipe 90 and the second flexible hose 80. Hydraulic fluid is thus pumped from the reservoir 86 to the interior of the hydraulic cylinder 64 above the piston 66. Simultaneously, the four-way valve 82 provides communication between the hydraulic fluid return pipe 102, and the first flexible hose 78, eventually communicating with the interior of the cylinder 64 below the piston 66. It will thus be seen that the hydraulic cylinder 64 will begin to rise, the fluid below the piston being returned to the reservoir 86 through the first internal fluid passage 74, the passage 74' at the base of the ram, the external pipe 74", the first flexible hose 78, and the return pipe 102. It is essential that the pump 88 have sufficient power to raise the support cylinder 64 at a speed faster than the downward speed of the ram 14, and fast enough to contact the billet before the upper knife 28 makes contact.

The point at which the support cylinder 64 contacts the underside of the billet 26 is illustrated in FIGURE 4. The ram 14 has begun its downward stroke, and the upper shearing knife 28 is nearly in contact with the billet 26. As the cylinder 64 contacts the underside of the billet 26, the resistance to movement will limit the upward speed of the support cylinder equal to the downward speed of the ram 14, thus maintaining contact with the billet 26. The release valve 96 will partially open, returning the excess hydraulic fluid to the reservoir 86. As hereinafter described, the hydraulic retaining means 62 will prevent the billet 26 from being lifted off the lower shearing knife. If the hydraulic retaining means 62 of the present invention are not empoyed, a conventional retaining or hold-down device (not shown) is employed, as is well known in the art.

As the ram continues its downward movement, the upper knife 28 eventually contacts the billet 26. This particular point in the operation of the device is shown in FIGURE 5. At this point, the release valve 96 is fully opened, and hydraulic fluid ceases to the support cylinder 64. Because of the check valve 92, fluid cannot be delivered in a reverse direction out of the area above the piston 66. The support cylinder 64 therefore remains in contact with the billet 26, and the billet 26 is in effect clamped between the upper knife 28 and the cylinder 64.

The actual shearing of the billet 26 is illustrated in FIGURE 6. There it is seen that the cylinder 64 remains in contact with the billet 26 while it is sheared, although the cylinder 64 does not move relative to the ram 14. The safety release valve 100 is optional, and is set at a fairly high pressure to prevent the buildup of excess pressure above the piston 66, which could damage the apparatus. Accordingly, the release valve 100 should be set to release at or preferably above a level corresponding to the force required to shear the billet 26, so that it will not release in normal operation, but will simply act as an emergency device.

After the shearing of the billet 26 is completed the ram 14 will reverse its direction as the crankshaft 38 continues to rotate. As the ram 14 begins its upward stroke, the control box 104 signals the four-way solenoid valve 82 to provide communication between the second flexible hose 80 and the return pipe 102. At the same time, communication is provided between the first flexible hose 78 and the delivery pipe 90. It will therefore be seen that hydraulic fluid will be pumped to the interior of the cylinder 64 below the piston 66 through the first internal fluid passage 74. Simultaneously, fluid will be free to flow from the area above the piston 66 through the second internal passage 76 and eventually through the return pipe 102 to the reservoir 86. The cylinder 64 will therefore move rapidly in a downward direction, retracting from the billet 26, and allowing the sheared portion to drop away. When the cylinder 64 reaches the bottom of its stroke, as shown in FIGURE 1, hydraulic fluid will again be simply recirculated through the recirculation pipe 94, caused by opening of the release valve 96. As the ram 14 reaches the top of its stroke, the apparatus is ready for the billet 26 to be advanced, and the above-described shearing process is repeated.

As previously mentioned, shearing machines of the type described conventionally include some sort of retaining or hold-down means to retain the billet 26 in contact with the lower knife 20. The most preferred embodiment of the present invention includes hydraulic retaining means 62, as illustrated in FIGURES 2 and 3. The hydraulic retaining means are shown in the retracted position in FIGURE 2, and in contact with the billet 26 in FIGURE 3. Basically, the retaining means 62 comprise a hydraulic hold-down cylinder 120 having an internal piston 122 fixedly mounted on a piston rod 124, which in turn is rigidly connected to a bracket 126 rigidly mounted on the back wall of the frame 12. This arrangement is basically the same as that for the hydraulic support means 60, and the cylinder and piston arrangement includes seals 128 similar to those described in connection with the support means 60. Also similar to the support means 60, the piston rod 124 and piston 122 have a pair of internal fluid passages, including a third internal fluid passage 130 communicating between the base of the piston rod 124 and a point just above the base of the piston 122 and a fourth internal fluid passage 132 communicating between the base of the piston rod 124 and the head of the piston 122. As shown in FIGURE 2, the hold-down cylinder 120 is positioned above the billet 26, and adapted to contact it when the cylinder 120 is moved in a downward direction.

The hold-down cylinder 120 is operated by hydraulic operating means generally indicated by reference numeral 134. The operating means 134 are functionally identical to the operating means 84 for the hydraulic support means 60. As shown in FIGURE 3, the operating means 134 include a hydraulic fluid reservoir 136 communicating with a pump 138. A fluid delivery pipe 140 communicates between the pump 138 and a four-way solenoid valve 142. The fluid delivery pipe 140 has a check valve 143 which prevents flow toward the pump 138. A recirculation pipe 144 having a pressure release valve 146 provides communication between the fluid delivery pipe 140 and the reservoir 136. The recirculation pipe 144 communicates with the fluid delivery pipe 140 at a point between the pump 138 and the check valve 143. As with the operating means 84 for the support means 60, the operating means 134 preferably includes a pipe 147 having a safety release valve 148 to provide communication between the delivery pipe 140 and the reservoir 136. Finally a hydraulic fluid return pipe 149 communicates between the reservoir 136 and the four-way solenoid valve 142. A third hydraulic fluid pipe 150 communicates between the four-way solenoid valve 142 and the third internal fluid passage 130. Similarly, a fourth hydraulic fluid pipe 152 communicates with the fourth internal fluid passage 132. The four-way solenoid valve 142 is controlled by the control box 104 through an electrical conduit 154.

In operation, at the beginning of a cycle the ram is in its fully upward position as shown in FIGURES 1–3, and the hold-down cylinder is in its fully retracted position as shown in FIGURE 2. The billet 26 is inserted to shear the desired length as previously described. As the ram begins its downward stroke, the solenoid valve 142 is switched to deliver hydraulic fluid from the delivery pipe 140 to the fourth hydraulic fluid pipe 152. The hydraulic fluid thus flows through the fourth internal fluid passage 132, out the piston head, and into the area between the piston head and the cylinder, causing the cylinder to move in a downward direction. Simultaneously, hydraulic fluid above the piston 122 is forced out through the third internal fluid passage 130 and the third hydraulic fluid pipe 152. The four-way solenoid valve 142 provides communication for this fluid to pass to the return pipe 149. When the cylinder 120 contacts the billet 26, the pressure will increase as a result of the resistance to movement. This causes the release valve 146 to open, and the hydraulic fluid simply recirculates through the recirculation pipe 144. This release valve 146 should be set to provide sufficient pressure on the billet 26 to firmly seat it in the lower shearing knife 20. Of course, the billet is also supported behind the shearing machine 10 by support means (not shown) which prevent the hold-down cylinder 120 from tilting the billet 26. As previously mentioned, the primary function of the retaining means 62 is to maintain the billet 26 firmly seated in the lower shearing knife 20, and thus to prevent its being lifted off the lower knife by the support means 60 or tilted when it is contacted by the upper shearing knife 28. It is important that the retaining means 62 contact the billet before the support means 60.

After the billet has been sheared as hereinbefore described, and as the ram 14 begins its upward stroke, the hold-down cylinder 120 is retracted by switching the four-way solenoid valve 142 to provide communication between the delivery pipe 140 and the third hydraulic fluid pipe 150. Similarly, communication is provided between the fourth fluid pipe 152 and the return pipe 149. When the cylinder 120 reaches the top of its stroke, as shown in FIGURE 2, fluid will simply be recirculated through the recirculation pipe 144 since the release valve 146 will open.

As may be appreciated from the above description of the present invention, a primary advantage is its simplicity of the operation, which permits the use of relatively few moving parts. Furthermore, the apparatus is simple to control since only the four-way solenoid valves 82, 142, need be switched in synchronization with the movement of the ram 14. As described above, both of the pumps 88, 138 run continuously.

It will also be appreciated that a single hydraulic system may be employed to simultaneously operate both the support means 60 and the retaining means 62. A single check valve would then serve to maintain both the support cylinder 64 and the hold-down cylinder 120 in contact with the billet 26. Varying degrees of commonality of hydraulic system components may obviously be provided between the extremes of a single system and completely separate systems. For example, a single reservoir could be utilized with separate pumps and valve systems for the support and hold-down cylinders. Similarly, all components could be common from the reservoir to the fourway solenoid valves, while the solenoid valves are separate units. The degree of commonality employed will depend on the particular applications of the shear, since separate hydraulic systems are somewhat more versatile, although obviously more expensive.

The apparatus of the present invention may be modified if it is desired to tailor it to a specific function such as the shearing of a particular uniform size or shape of stock. While the hold-down and support cylinders shown contact the stock with flat surfaces, and are thus adaptable to virtually any shape of stock, they may obviously be tailored to fit the stock more closely, thus providing even better support. For example, for the stock of square cross-section shown in the drawings, the support cylinder 64 could have a notch in its surface conforming to the billet 26, while the hold-down cylinder 120 could have a similar notch.

Obviously, many modifications and variations of the present invention will occur to those skilled in the art, and it is intended to cover in the appended claims all such modifications and variations as fall within the true spirit and scope of the invention.

I claim:

1. In a shearing machine of the type including a frame, a stationary knife fixedly mounted on said frame and adapted to receive material to be sheared, a ram mounted on said frame for reciprocation between a first and second position, drive means for reciprocating said ram, and a movable knife fixedly mounted on said ram and positioned for movement adjacent to said stationary knife in close spaced relationship therewith to shear said material when said ram moves from said first position to said second position, the improvement comprising: hydraulic support means for supporting said material, said support means carried by said ram and positioned for movement parallel to said ram into contact with said material opposite said movable knife; and operating means for moving said support means into contact with said material and maintaining said support means in rigid supporting contact with said material when said material is sheared by said knife.

2. The shearing machine as defined in claim 1 wherein said hydraulic support means comprise a hydraulic cylinder fitted over a piston, said piston fixedly mounted on a rod, and said rod fixedly mounted on said ram below said movable knife.

3. The shearing machine as defined in claim 1 further including hydraulic retaining means carried by said frame and positioned for movement to maintain said material positioned on said stationary knife.

4. The shearing machine as defined in claim 3 wherein said retaining means comprise a hydraulically actuated retaining cylinder and piston assembly, said piston fixedly mounted on a rod and said rod fixedly mounted on said frame.

5. In a shearing machine of the type including a frame, a lower knife mounted on said frame and adapted to support metal to be sheared, a ram mounted on said frame for reciprocation between a first and second position, drive means for reciprocating said ram, and an upper knife fixedly mounted on said ram and positioned for movement to a position adjacent to said lower knife in close spaced relationship therewith to shear said metal when said ram is moved from said first position to said second position, the improvement comprising: a hydraulic support cylinder for supporting said metal, said cylinder fitted over a piston, said piston fixedly mounted on a rod, and said rod fixedly mounted on said ram, said cylinder, piston, and rod positioned opposite said upper knife, and said cylinder adapted for movement into supporting contact with said metal; and operating means for moving said cylinder into contact with said metal and for maintaining said cylinder in rigid supporting contact therewith when said metal is sheared by said knives.

6. The metal shearing machine as defined in claim 5 wherein said rod includes first and second internal fluid passages, said first passage communicating with the interior of said cylinder below said piston and said second passage communicating with the interior of said cylinder through the head of said piston, and wherein said operating means include hydraulic fluid reservoir and pump means communicating with said passages through pipe means, and valve means on said pipe means.

7. The metal shearing machine as defined in claim 5 further including a hydraulic hold-down cylinder for applying pressure to the top of said metal to retain it in contact with said lower knife, said hold-down cylinder fitted over a piston and rod, said rod fixedly connected to said piston and mounted on said frame, and said rod having third and fourth internal fluid passages, said third passage communicating with the interior of said retaining cylinder above said piston and said fourth passage communciating with the interior of said cylinder through the head of said piston, said third and fourth passages communicating with said operating means through pipe means.

8. The metal shearing machine as defined in claim 6 further including a hydraulic hold-down cylinder for applying pressure to the top of said metal to retain it in contact with said lower knife, said hold-down cylinder fitted over a piston and rod, said rod fixedly connected to said piston and mounted on said frame, and said rod having third and fourth internal fluid passages, said third passage communicating with the interior of said retaining cylinder above said piston and said fourth passage communicating with the interior of said cylinder through the head of said piston, said third and fourth passages communicating with said operating means through pipe means.

9. The metal shearing machine as defined in claim 6 further including a hydraulic hold-down cylinder for applying pressure to the top of said metal to retain it in contact with said lower knife, said hold-down cylinder fitted over a piston and rod, said rod fixedly connected to said piston and mounted on said frame, and said rod having third and fourth internal fluid passages, said third passage communicating with the interior of said retaining cylinder above said piston, and said fourth passage communicating with the interior of said cylinder through the head of said piston; hydraulic fluid reservoir and pump means communicating with said third and fourth passages through pipe means; valve means on said pipe means, said valve means and pump means adapted to move said hold-down cylinder toward and away from said metal, and to maintain said hold-down cylinder in rigid contact with said metal as said metal is sheared by said knives.

References Cited

UNITED STATES PATENTS

| | | | |
|---|---|---|---|
| 2,814,343 | 11/1957 | Anderson | 83—157 |
| 2,837,157 | 6/1958 | Gunther | 83—378 |
| 3,152,499 | 10/1964 | Moelbert | 83—378 X |

FRANK T. YOST, Primary Examiner

U.S. Cl. X.R.

83—157, 390, 460